United States Patent

[11] 3,627,718

[72] Inventors: Friedrich Seifert; Dieter Carla, both of Marl, Germany
[21] Appl. No.: 866,369
[22] Filed: Oct. 14, 1969
[45] Patented: Dec. 14, 1971
[73] Assignee: Chemische Werke Huls Aktiengesellschaft Marl, Germany
[32] Priority: Oct. 18, 1968
[33] Germany
[31] P 18 03 787.1

[54] POLYVINYL CHLORIDE COMPOSITIONS FOR THE PRODUCTION OF ANTISTATIC HOLLOW BODIES AND BLOWN FILMS
9 Claims, No Drawings

[52] U.S. Cl. .................................................. 260/23 XA, 260/92.8 A
[51] Int. Cl. .................................................. C08f 29/18
[50] Field of Search ......................................... 260/23 XA, 92.8 A, DIG. 15, DIG. 16

[56] References Cited
UNITED STATES PATENTS

| | | | |
|---|---|---|---|
| 2,316,169 | 4/1943 | Japs | 260/23 |
| 2,648,650 | 8/1953 | Weinberg et al. | 260/45.75 X |
| 2,752,325 | 6/1956 | Leistner et al. | 260/45.75 |
| 2,870,182 | 1/1959 | Leistner et al. | 260/45.75 X |
| 2,993,234 | 7/1961 | Miura et al. | 260/23 X |
| 3,518,224 | 6/1970 | Eggensperger et al. | 260/23 X |

Primary Examiner—Donald E. Czaja
Assistant Examiner—Donald J. Barrack
Attorney—Krafft & Wells

ABSTRACT: Polyvinyl chloride compositions are made particularly useful for the production of antistatic hollow bodies and blown films by adding:

a. one to three percent by weight of one or more compounds of the formula

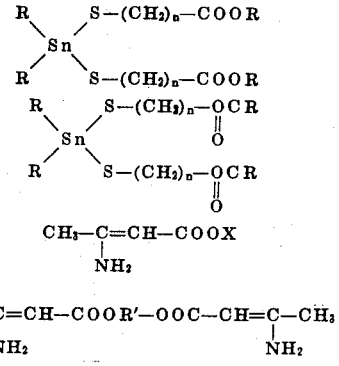

$$CH_3-C=CH-COOX$$
$$\phantom{CH_3-C=CH-}|$$
$$\phantom{CH_3-C=CH-}NH_2$$

or $$CH_3-C=CH-COOR'-OOC-CH=C-CH_3$$
$$\phantom{CH_3-}|\phantom{=CH-COOR'-OOC-CH=C-}|$$
$$\phantom{CH_3-}NH_2\phantom{=CH-COOR'-OOC-CH=C-}NH_2$$

wherein R is an alkyl with four to 12 carbon atoms, $n$ is a whole number from one to four, X is an alkyl or alkenyl group with eight to 20 and preferably 16 to 18 carbon atoms, and R' is an alkylene group with two to eight and preferably two to four carbon atoms which can contain a hetero-atom, including oxygen or sulfur;

b. 0.4 to 2.5 percent and preferably 0.6 to 1.5 percent by weight of one or more esters of a saturated or unsaturated fatty acid with seven to 30 carbons atoms and a monovalent alcohol with eight to 31 carbon atoms and/or one or more partial esters of such a fatty acid and a polyvalent alcohol with two to four carbon atoms or a polyalkylene glycol of two to 10 ethylene oxide or propylene oxide units; and c. 0.4 to 2.5 and preferably 0.6 to 1.5 percent by weight of one or more higher alcohols with nine to 28 carbon atoms or such higher alcohols having oxyalkylation products with 1–10 ethylene oxide or propylene oxide units, wherein the total weight percent of components (b) and (c) combined is not over three percent and all indicated percentages by weight refer to the total mixture

POLYVINYL CHLORIDE COMPOSITIONS FOR THE PRODUCTION OF ANTISTATIC HOLLOW BODIES AND BLOWN FILMS

BACKGROUND OF THE INVENTION

The field of the invention is polymerized unsaturated compounds from acyclic vinyl halides and the invention is particularly concerned with antistatic agents for polyvinyl chloride.

The general state of the art of antistatic agents is set out in Kirk-Othmer "Encyclopedia of Chemical Technology," 2nd Edition, Vol. 2 (1963), pages 649-672, particularly pages 665-667 wherein durable antistatic agents for plastics are disclosed, and pages 668-671 the tests for measuring static propensity are disclosed. The state of the art of vinyl chloride resins may be ascertained by reference to Kirk-Othmer, Vol. 14 (1955), pages 723-735, under the section "Vinyl Chloride," particularly pages 734 and 735, wherein rigid resins are disclosed and the bibliography for vinyl chloride is given and the book "Vinyl Resins" (1958), of W. M. Smith of the Reinhold Publishing Co., particularly the sections on "Dry Blending," beginning at page 111, "Vinyl Calendering," beginning at page 113, "Blown Extrusion of Film," beginning at page 141, "Fillers, " beginning at page 194, "Rigid Vinyls," beginning at page 216, "Compound Preparation," beginning at page 233, and "Rigid PVC Film," beginning at page 258.

According to the prior art, polyvinyl chloride is rendered antistatic by adding plasticizers together to it along with specific kinds of soot [British Pat. No. 858,530 of May 9, 1956; DAS (West German Printed Specification) 1,153,706 of Sept. 5, 1963. Soft polyvinyl chloride is, however, not always usable, whereas hard polyvinyl chloride carries with it a number of unresolved problems. For dealing with these the DAS (West German Printed Specification) 1,217,641 of May 26, 1966 describes certain additional mixtures of 0.2 to 2 percent by weight of stearamido-propyl-methyl-$\beta$-hydroxyethyl-ammonium-nitrate or alkylpyridinium chloride etc., with phosphoric acid ester salts and polyethylene-glycol-alkyl-esters or -ethers. Such combinations are, however, limited in their usefulness to the production of sound recording disks because the ammonium compounds quickly produce scorching effects in the material as the result of continuous operations such as extrusions. As a result, the remaining compounds have to be added in unreasonable amounts and even then do not have any noticeable effect except under high humidity conditions of more than 75 percent.

It is also old to add antifriction materials to the polyvinyl chloride so that it can be worked upon more easily, such materials include among others, higher alcohols and esters of the saturated and unsaturated carboxylic acids with mono- or polyvalent alcohols (see Kainer, Polyvinylchlorid und Vinylchlorid-Mischpolymerisate, Springer Verlag, 1951, page 190 "Plastifizierung" 2nd paragraph). Although each of these compositions (because of its chemical makeup which includes a long-chain hydrophobic group and a less prominent hydrophilic group) should have good internal antistatic properties, such effects, in cases where they can be measured at all, are only very slight and are noticed only under relative humidities higher than 75 percent. Under the usual practical working conditions good internal antistatic properties are not provided by the prior art.

Efforts have also been made to stabilize vinyl chloride polymers [DAS (West German Printed Specification) 1,179,708, page 1, lines 7-9]. The same is also true of the stabilizing of chlorinated vinyl polymers by additions thereto of sulfur-containing compounds of tetravalent tin of the following formulas:

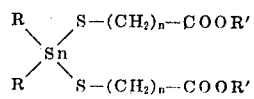

as disclosed in U.S. Pat. Nos. 2,641,596 of Leistner et al., dated June 9, 1953, entitled "Organic Derivatives of Tetravalent Tin," and 2,648,650 of Weinberg et al., dated Aug. 11, 1953, and entitled "Organo Tin Compounds and Compositions Containing Same;" and

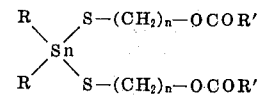

as disclosed in U.S. Pat. No. 2,870,182 of Leistner et al., dated Jan. 20, 1959, and entitled "Organic Derivatives of Tetravalent Tin."

Although additions of tetravalent tin compounds to vinyl chloride polymers show satisfactory stabilizing effects, they do not have any antistatic effect. (See the comparison tests of table 1).

It is also known that antifriction compositions of montan acid esters of fatty acid alcohols with 16 to 18 carbon atoms are useful for producing hollow bodies of hard polyvinyl chloride (Plastverarbiter, Vol. 7, 1965, pages 403 to 405, especially the table on page 405). In the same reference (page 404, right column, lines 19+), it is stated that the inflatable receptacles should have tin and sulfur containing compounds such as di-n-butyl-tin-mercaptide or di-n-octyl-tin-mercaptide added to them as stabilizers. Although such mixtures show satisfactory antifriction properties and stability, they do not have sufficient antistatic effect.

SUMMARY OF THE INVENTION

Having in mind the limitations of the prior art, it has been found that polyvinyl chloride compositions are especially suitable for the production of antistatic hollow bodies and blown films if besides the usual additives they also contain;

a. about 1 to 3 percent by weight of one or more compounds of the formulas:

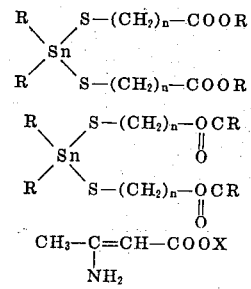

or

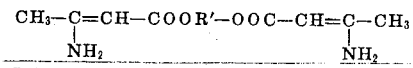

wherein R is an alkyl group having four to 12 carbon atoms, $n$ is a whole number from 1 to 4, X is an alkyl or alkenyl group having eight to 20 and preferably 16 to 18 carbon atoms and R' is an alkylene group with two to eight and preferably two to four carbon atoms which can include a heteroatom such as oxygen or sulfur;

b. about 0.4 to 2.5 percent by weight, preferably 0.6 to 1.5 percent of one or more esters of a saturated or unsaturated fatty acid with seven to 30 carbon atoms and a monovalent alcohol with eight to 31 carbon atoms and/or one or more partial esters of such a fatty acid and a polyvalent alcohol with two to four carbon atoms or a polyalkylene glycol with two to 10 ethylene oxide or propylene oxide groups; and c. about 0.4 to 2.5 percent by weight, preferably 0.6 to 1.5 percent of one or more higher alcohols with nine to 28 carbon atoms or their oxyalkylation products with one to 10 ethylene oxide or propylene oxide groups.

In the above compositions, the total additions of components $b$ and $c$ should not be more than 3 percent by weight of the entire mixture.

The process described above comprises a genuine synergistic relation of known characteristics in which besides the use of particular additions in specific amounts, their introduction into the mixture by suitable methods for the production of hollow bodies or blown films is also included. The resulting effects are, however, largely independent of the particular mixing and molding processes used.

The substances mentioned under a are concerned on the one hand with organic tin compounds of the group that is generally used as tin stabilizers for polyvinylchloride, and on the other hand with compounds that are desmotropic (i.e., tautomeric) with β-imino-butyric acid esters of the metal free polyvinyl chloride stabilizers. The first of these have the general formula:

in which R is an alkyl group with two to 12, preferably four to eight carbon atoms and X is a monovalent group of the constructions:

$$-S\cdot(CH_2)_n\cdot COOR' \text{ or}$$

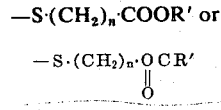

wherein n is a whole number from 1 to 4, preferably 1 or 2, and R' is an alkyl group with four to eight carbon atoms.

They are obtained by reacting alkyl-tin compounds with suitable esters of an alcohol and a percaptoacid or of a mercaptoalcohol and a monocarboxylic acid, for example, according to U.S. Pat. No. 2,648,650 of Weinberg et al. which issued Aug. 11, 1953, having the title "Organo Tin Compounds and Compositions Containing Same," or according to U.S. Pat. No. 2,870,182 of Leistner et al. which issued Jan. 20, 1959 having the title "Organic Derivatives of Tetravalent Tin," or the corresponding British Pat. No. 740,392. It is, however, also possible to add an excess of aqueous 25 percent ammonia solution to an acetone solution of alkyl-tin chlorides $R_2SnCl_2$ at temperatures between 0° and 30° C. and to react the resulting ammonia complexes of the formula $R_2SnCl_2 \cdot 2NH_3$ in benzene or other inert organic solvent with the mercapto-acid-esters of esterified mercaptoalcohols as disclosed in Belgian Pat. No. 616,663 of Apr. 19, 1962. As examples of some of these especially suitable tin compounds produced by one of these processes are mentioned:

Dibutyl-tin-di-mercapto-ethanol capric acid ester)
Dihexyl-tin-bis-(thioglycol-acid-isooctyl ester)
Dioctyl-tin-bis-(thiopropionic-acid-2-ethyl-hexyl ester)
Dipentyl-tin-di-(mercapto-ethanol-caprylic-acid ester), the preferred compounds being—
Dioctyl- or dibutyl-tin-bis 'thiopropionic acid-2-ethyl-hexyl-ester) or the analogous thioglycol-acid derivatives, either by themselves or in mixtures.

The β-amino crotonic acid ester named under a is obtained by amination of a suitable acetoacetic ester or by the addition of $NH_3$ to the tetrol acid ester by applying concentrated aqueous or alcoholic ammonia as in the usual method of production of β-amino crotonic acid ethyl ester (Precht, B. 11, 1194, Duisberg, A 213, 171 Feist, A 345, 110).

In the formula

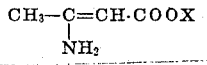

X is an alkyl or an alkenyl group with eight to 20, and preferably 16 to 18 carbon atoms, or a group—

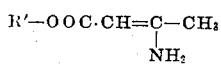

in which R' is an alkyl or an alkenyl group with two to eight and preferably two to four carbon atoms, which can contain a heteroatom of oxygen or sulfur.

Specific examples of the compounds without heteroatom are:
β-Amino-crotonic acid hexadecyl ester,
β-Amino-crotonic acid hexadecenyl ester,
β-Amino-crotonic acid octadecyl ester,
β-Amino-crotonic acid ethylhexyl ester,
Glycol-bis-amino-crotonate,
preferably 1-, 4-butylene glycol-bis-β-amino-crotonate alone or in mixture with hexadecyl-, heptadecyl- and/or octadecyl-β-amino-crotonic acid esters.

Specific examples of the formula:

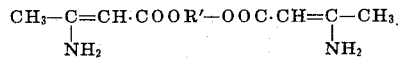

wherein R' is an alkylene group with two to eight carbon atoms containing a hetero atom of oxygen or sulfur are:
thiodiethylene glycol-bis-β-amino-crotonate,
thiodipropylene glycol-bis-β-amino-crotonate,
thiodibutylene glycol-bis-β-amino-crotonate,
diethylene glycol-bis-β-amino-crotonate,
dipropylene glycol-bis-β-amino-crotonate,
preferably thiodiethylene glycol-bis-β-amino-crotonate alone or in mixture with one of the above-named amino-crotonic acid esters.

The esters named in b are obtained by boiling the carboxylic acid in concentrated form with the alcohols, by using hydrochloric acid or somewhat concentrated sulfuric acid, or by reacting the hydrogen halogen ester together with sodium-, potassium salts of the fatty acids, if necessary, also over the acidic chloride and alcohols or by direct addition of alkylene oxide to the carboxyl group. The esters are based on carboxylic acid with seven to 30, and preferably 12 to 27 carbon atoms and on the one hand monovalent alcohol, with eight to 31 and preferably 16 to 31 carbon atoms, and on the other hand, only polyvalent alcohols with two to four and preferably two to three carbon atoms, as well as polyalkylene glycols of two to 10 and preferably two to seven ethylene- or propylene oxide units.

Examples of the compounds under b are: the esters of enanthic-, caprylic-, pelargonic-, capric- and undecylic acids, especially the lauric-, myristic-, palmitic-, stearic-, arachidic-, behenic-, lignoceric-, oleic-, erucic- and montanic acids with a monovalent alcohol such as preferably octyl-, nonyl-, decyl-, undecyl-, dodecyl-, but ceytl-, ceryl- and myricyl alcohol on the one side; on the other side, only a polyvalent alcohol such as propanediol-1, -2 and 1-, 3-butylene glycol, and 1-, 4-butylene glycol, octa-, nonadeca-ethylene- or propylene glycol, but preferably glycerine, and ethanediol, as well as di-, tri-, tetra-, penta-, hexa- and heptaethylene glycol. In the last cases, the partial esters can be used and especially the lauric-, myristic-, palmitic-, stearic-, oleic-, arachidic- and montanic acid with ethanediol, glycerine, di-, tri-, tetra-, penta-, hexa- and heptaethylene glycol. Also the raw esterification mixture can be used as partial esters which contain a small quantity of triester and free polyvalent alcohol.

The specific compounds under b include glycerine monostearate, glycerine monolaurate, glycerine monocaprylate, montanic acid-myricyl ester, montanic acid ester with 1-, 3-butanediol, diethylene glycol monooleate, 1-, 4-butylene glycol monopalmitate, hepta ethylene glycol monolaurate, glycerine monooleate, 1-, 3-propanediol-monocaprylate, arachidic acid ester of hexaethylene glycol, myristic acid ester of cetylalcohol, behenic acid ester of myricyl alcohol, glycerine monobehenate; glycerine monopalmitate, 1-, 3-propanediolmonooleate, glycerine monocaprinate, glycerine monopelargonate, glycerine monoarachinate.

The compounds of group c comprise higher monovalent alcohols with nine to 28 and usually 12 to 18 carbon atoms and whose products of alkoxylization comprise one to 10 and preferably one to six ethylene oxide or propylene oxide units. They are obtained e.g. by direct reduction of a suitable carboxylic acid with the use of Cu-, Ni- and Co-catalysts at high temperature and pressure and their alkylene oxide addition products by simple addition reaction between ethylene or propylene oxide and the foresaid alcohols. Examples of the alcohols and their alkylene oxide addition products are: nonylalcohol and its oxalkylate with one to 10 ethylene oxide or propylene oxide units, such as nonyl-, di-, tri-, tetra-, hepta-, octa- and decaethylene glycol or propylene glycol or decyl-, undecyl-, ceryl-, octadecyl- and especially dodecyl-, cetyl- and stearyl alcohol and finally their di-, tri-, tetra-, octa- and decaethylene glycol or propylene glycol derivatives.

The specific compounds under c include cetyl alcohol, lauryl heptaethylene glycol, fatty alcohol mixture of alcohols having 16 to 18 carbon atoms, myristyl alcohol, lauryl alcohol, myristyltetrapropylene glycol, stearyl alcohol, fatty alcohol mixture of alcohols having 12 to 14 carbon atoms, tridecyl alcohol, nonylalcohol, cerylalcohol, nonyldecaethylene glycol, decylalcohol, decylethylene glycol.

Additionally, for the occurrence of the antistatic effect, indispensable constituents can be added to the mixture, as for example the ester of phosphoric acid, alkyl and alkyllauryl phosphite with six to 12 carbon atoms in the alkyl chain, and further expoxylated esters of unsaturated fatty acids with 10 to 25 carbon atoms, for example epoxylated butyloleate, epoxylated linseed oil, ricine oil or soybean oil, as well as specifically the amino crotonic acid ester-containing mixtures of zinc, calcium and magnesium salts of fatty acids with eight to 20 carbon atoms as additional heat-stabilizing ingredients. Finally, components having sharply striking polar characteristics, such as butadiene acrylonitrile elastomer, having between 20 and 60 percent by weight acrylonitrile or ABS polymers or polymer mixtures are used. An example is described in U.S. Pat. No. 3,053,800 of Grabowski et al., entitled "Blends of (1) Polyvinylchloride, (2) A Copolymer of Polybutadiene, Styrene and Acrylonitrile, and (3) A Copolymer of Acrylonitrile, Styrene and Alpha Methyl Styrene" and having an issue date of Sept. 11, 1962. If necessary, up to 50 percent by weight vinyl chloride grafted ethylene vinyl acetate copolymer containing an acetate group of the copolymer components between ca. 40 and 60 percent by weight, or also acrylic- or methacrylic ester resins with actual viscosity of Brookfield (20percent) solution in methyl ethyl ketones of 100 to 5,000 cP are used. Also, small additions of pulverized low-pressure polyethylene (molecular weight under 100,000, size of nucleus smaller than 80 $\mu$ ) can be made.

All of the additions named here, as being absolutely necessary, or advisable only for occasional specific additions, are appropriately introduced into the polyvinyl chloride powder in a mixer. The powder mixture produced between room temperature and 80° C. is supplied to the processing machine for condensation to a granular state or is agglomerated between 100° and 115°C. for production of the hollow bodies or blown films directly at a temperature of somewhere between 140° and 220°C.

The polyvinyl chloride base material naturally shall contain some emulsifier, i.e. the normal S-PVC and water-extracted E-PVC types can be used (for methods of production see F. Kainer; Polyvinyl Chloride and Vinyl Chloride Mixture Polymers, Springer-Verlag 1965, pages 12 to 59, "Emulsion Polymers"; and "Suspension Polymers"). Further PVC-types can be used as made by bulk polymerization (production techniques, such as mentioned for example in Belgian Pat. No. 663,193, of Apr. 29, 1965, and Oct. 29, 1965, or French Pat. No. 1,436,744 of Mar. 17, 1965, and Mar. 21, 1966).

The K values according to DIN German Industrial Standard 53 726 [also see Fikentscher, Cellulosechemie 13, 60 (1932)] range from 55 to 70.

DESCRIPTION OF THE PREFERRED EMBODIMENTS

Specific examples of the overall combination of PVC with components a, b and c in parts by weight include:

100 S-PVC, 1.5 dibutyl-tin-bis-(thioglycolic-acid-2-ethylhexyl ester), 0.5 glycerine monostearate, 1.0 cetyl alcohol;

100 S-PVC, 1.5 dioctyl-tin-bis-(thioglycolic acid-2-ethylhexyl ether), 0.5 glycerine monostearate, 1.0 cetyl alcohol;

100 S-PVC, 2.0 thiodiethyleneglycol-bis-$\beta$-aminocrotonate, 0.2 Ca-Zn-stearate, 0.8 butylepoxystearate, 0.5 glycerinemonostearate, 1.0 cetyl alcohol;

100 S-PVC, 1.5 dibutyl-bis-di-mercaptoethanol-lauric acid ester, 1.0 lauryl hepta-ethylene glycol, 1.0 oleic acid glycerine ester mixture;

100 S-PVC, 1.5 dioctyl-tin-dimercaptoethanol lauric acid ester, 0.7 montaric acid myricyl ester, 1.2 fatty alcohol mixture of alcohol having 16 to 18 carbon atoms;

100 S-PVC, 1.5 dibutyl-tin-bis-(thioglycolic acid-2-ethylhexyl ester), 0.7 montanic acid ester with 1-, 3-butanediol, 1.2 fatty alcohol mixture of alcohols having 16–18 carbon atoms;

100 S-PVC, 1.5 dioctyl-tin-bis-(thioglycolic acid-2-ethylhexyl ester), 1.0 diethylene glycolmonooleate, 1.2 laurylheptaethylene glycol;

100 S-PVC, 2.0 $\beta$-aminocrotonic acid ethylhexyl ester/1-, 4-butylene glycol-bis-$\beta$-amino-crotonate mixture (1:1), 0.2 Ca, Zn-stearate, 0.8 butylepoxy-stearate, 0.6 heptaethylene glycolmonolaurate, 1.2 myristyl alcohol;

100 M-PVC*(*M-PVC = made by bulk polymerization), (K-valve = 58) 1.5 dibutyl-tin-bis-(thioglycolic acid-2-ethylhexyl ester), 0.6 glycerine monocaprylate, 1.0 ceryl alcohol;

100 M-PVC, 1.5 dioctyl-tin-bis-(thioglycolic-acid-2-ethylhexyl ester), 0.5 glycerine monolaurate, 1.0 fatty alcohol mixture of alcohols having 12 to 14 carbon atoms;

100 M-PVC, 2.0 thiodipropylene glycol-bis-$\beta$-aminocrotonate, 0.2 Ca-, Zn-stearate, 0.8 butylepoxystearate, 0.6 glycerine monoarachinate, 1.3 myristyltetrapropylene glycol;

100 M-PVC, 2.0 thiodibutylene glycol-bis-$\beta$-aminocrotonate, 0.2 Ca-, Zn-stearate, 0.8 butylepoxystearate, 0.5 glycerine monobehenate, 1.0 fatty alcohol mixture of alcohols having 16 to 18 carbon atoms;

100 M-PVC, 1.3 thiodiethyleneglycol-bis-$\beta$-aminocrotonate, 0.7 diethylene glycol-bis-$\beta$-amino-crotonate, 0.2 Ca-, Zn-stearate, 0.8 butylepoxystearate, 0.3 glycerine monopelargonate, 0.3 myristic acid ester of cetyl alcohol, 1.0 octadecyl alcohol;

100 M-PVC, 1.3 thiodipropylene glycol-bis-$\beta$-aminocrotonate, 0.7 dipropylene glycol-bis-$\beta$-aminocrotonate, 0.2 Ca-, Zn-stearate, 0.8 butylepoxystearate, 1.0 glycerine monopalmitate, 0.3 nonyldecaethylene glycol, 0.3 decylalcohol;

100 M-PVC, 1.0 1-, 4-butylene glycol-bis-$\beta$-aminocrotonate, 1.0 thiodiethylene glycol-bis-$\beta$-aminocrotonate, 0.2 Ca-, Zn-stearate, 0.8 butylepoxystearate, 0.3 arachidic acid ester with hexaethylene glycol, 0.3 1-, 3-propanediol-mono-caprylate, 1.3 cetyl alcohol;

100 E-PVC, (K-value 70) (Emulsifier extracted) 2.0 dioctyl-tin-bis-(thioglycolic-acid-isooctylester), 0.5 glycerine monocaprinate, 1.0 stearyl alcohol;

100 E-PVC, 2.0 dibutyl-bis-di-mercaptoethanol-lauric acid ester, 0.3 behenic acid ester of myricyl alcohol, 0.3 1-, 3-propanediol-mono-caprylate, 1.0 cetyl alcohol;

100 E-PVC, 2.0 dioctyl-tin-bis-(thioglycolic acid-2-ethylhexyl ester), 0.3 1-, 4-butylene glycol monopalmitate, 0.6 glycerine monostearate, 0.6 cetyl alcohol. Without further elaboration, it is believe that one skilled in the art can, using the preceding description, utilize the present invention to its fullest extent.

The following examples A through D illustrate the processing of the PVC compositions to form calendered and blown films.

One hundred parts by weight of a dry powder S-PVC (K-value 60) are introduced into a fluid mixer (system Henschel). To this dry powder S-PVC there are added in any way these components:

| 2.0 parts by weight based on 100 parts PVC | dioctyl-tin-bis-(thioglycolic acid-2-ethylhexyl ester), |
| --- | --- |
| 2.0 parts by weight based on 100 parts PVC | glycerine monosterate |
| and 0.5 parts by weight based on 100 parts PVC | $C_{16}/C_{18}$ fatty alcohol mixture (ca. 1:1). |

By mixing for 5 minutes while heating to ca. 80° C. the components and the PVC are intimately mixed.

The resulting dry mixture is divided into two equal parts A and B and these two parts are processed in the following way.

EXAMPLE A

Part A is introduced into a double screw extruder (system Mapré), temperature increasing from 140° to 170° C. over the whole length of the extruder; 15 r.p.m., resulting in an effect of 50 kg./h., (kilograms per hour) and the obtained granulated mass is introduced in a one screw extruder (system Bandera), this one screw extruder having a prearranged blowhead (diameter of the die = 50 mm.; width of the die gap = 0.8 mm.) and having a cylindrical screw with conical core (compression ratio = 1 : 2.20), the temperature increasing from 130° to 160° C. over the whole length of the extruder. At a rotation speed of 15 r.p.m. the granulate is processed to a blown film in the usual manner (characteristics: table II, 2).

EXAMPLE B

Part B is plasticized for 5 minutes on a heated calender at 160° C. The resulting fleece thereafter is processed on a three-cylinder calender (system Eck) at temperatures first of 185° C. (lowest cylinder), second of 190° C. (medium cylinder), third of 190° C. (upper cylinder) to a film with 60 $\mu$ gauge. (Characteristics: table II, comparative example).

EXAMPLES C AND D

One hundred parts by weight of a dry powder S-PVC (K-value 58) are introduced into a fluid mixer (system Henschel). To this dry powder PVC there are added in any order the following described components:

| 1.5 parts by weight based on 100 parts PVC | dibutyl-tin-bis-(thio-glycolic acid 2-ethylhexyl ester) |
| --- | --- |
| 0.5 parts by weight based on 100 parts PVC | glycerine monooleate |
| 1.0 parts by weight based on 100 parts PVC | cetyl alcohol |

By mixing for 5 minutes while heating to ca. 80° C. the described components and the PVC powder are intimately mixed.

The resulting mixture is divided in two equal parts C and D and these two parts are processed in the following way.

Part C is processed in the manner described in example A in a double-screw extruder (system Malpré) to a granulated mass.

Part D, remaining in the fluid mixer, is processed therein for further 6 minutes at a temperature between 100° and 115° C.

The resulting agglomerate is introduced into a one-screw extruder (system Bekum), having an inflating connection prearranged; the temperature increasing over the whole length of the extruder from 160° to 190° C. At a rotation speed of 25 r.p.m. the agglomerate is processed into hollow bodies (characteristics described in table I, example 14).

Part C is processed in the same manner as just described in the one-screw extruder (system Bekum), with hollow bodies resulting.

The following described ash test serves to identify the antielectrostatic properties of the article according to the invention.

A small form which has been rubbed mechanically with a towel is held over crushed cigar or cigarette ashes. The shorter the chosen interval during which the ashes are picked up, the better is the antielectrostatic property. The test is considered positive if the rubbed form with a temperature of 23° C. and a relative humidity of 50 percent, picks up no ashes in the time interval. Observation of the local humidity is especially important for a proper evaluation, as it closely influences the results of the test.

The examples shown in table I illustrate the synergistic effect of the antielectrostatic mixtures according to examples 14 to 21 in the similarity of the receiver in which over two synergistically active elements are missing or have otherwise exceeded [overrun the set borders] in quantity the standards set. For the experiments, S-PVC is used as the manufactured PVC having a K value of 58, so that no matter what methods of production of the polymers is used, no discrepancies are detected regarding the antistatic preparation process.

The organic tin compounds or $\beta$-amino crotonic acid esters defined by the present invention produce no effect by themselves. Also, although an addition of glycerine monoester or fatty alcohol lowers the surface resistance, it does so only to an unsatisfactory degree, so that the hollow bodies still pick up some ashes in the test. This does not change if one of the required elements for the formation of the synergistic effect is measured in quantities below the standards set (compare the numbers 10 and 11 of the table with numbers 5 and 6). The combination according to the invention in examples 14, 15 and 16 consisting of organic tin compounds or amino crotonic acid ester, glycerine ester and fatty alcohol, as defined by the present invention, allows a surprising effect. The critical character of the striking selection is further confirmed in examples 12 and 13, which contain components $b$ and $c$, as defined by the present invention as dialkyl-tin-mercapto-compounds whose structures differ from those considered under component $a$ according to the present invention. Finally, in the examples 17 to 21 are shown the results of some further combinations according to the invention.

In table II is shown the surprising influence of the process on the electrostatic properties of film materials prepared according to the invention. The interaction of the constituents of a calendered film which has been prepared according to the invention remains unsatisfactory while blown films manufactured of the same mixture show antistatic properties [compare, in example 2:$a$ calendered film with $b$ inflatable film].

TABLE I.—Electrostatic properties of hollow bodies having the embodiment of a 0.33 liter short necked round bottle 16 cm. high and 6.5 cm. average bottom surface width.

| Ex. No. | Additions | Parts by weight [a] | Surface resistance in ohms | Fading away [1] of electric charge [b] | Ash test [b 2] | Remarks |
| --- | --- | --- | --- | --- | --- | --- |
| 1 | Dibutyl-tin-bis-(thioglycol-acid-2-ethylhexyl ester) | 1.5 | >$10^{12}$ | Slowly | — | Comparative Example. |
| 2 | Dioctyl-tin-bis-(thioglycol-acid-2-ethylhexyl ester) | 1.5 | >$10^{12}$ | do | — | Do. |
| 3 | Thiodiethylene glycol-bis-$\beta$-aminocrotonate<br>Ca-Zn stearate<br>Butyl epoxy stearate | 2.0<br>0.2<br>0.8 | >$10^{12}$ | do | — | Do. |
| 4 | Dibutyl-tin-bis-(thioglycol-acid-2-ethylhexyl ester)<br>Glycerine monostearate [3] | 1.5<br>1.0 | 5.$10^{11}$ | do | ($\mp$) | Do. |
| 5 | Dioctyl-tin-bis-(thioglycol-acid-2-ethylhexyl ester)<br>Glycerine monostearate [3] | 1.5<br>1.0 | 5.$10^{11}$ | do | ($\mp$) | Do. |
| 6 | Dibutyl-tin-bis-(thioglycol-acid-2-ethylhexyl ester)<br>Cetyl alcohol | 1.5<br>1.0 | 5.$10^{11}$ | do | ($\mp$) | Do. |
| 7 | Dioctyl-tin-bis-(thioglycol-acid-2-ethylhexyl ester)<br>Cetyl alcohol | 1.5<br>1.0 | 5.$10^{11}$ | do | ($\mp$) | Do. |
| 8 | Thiodiethylene glycol-bis-$\beta$-amino crotonate<br>Ca-Zn stearate<br>Butyl epoxy stearate<br>Glycerine monostearate [3] | 2.0<br>0.2<br>0.8<br>1.0 | 5.$10^{11}$ | do | ($\mp$) | Do. |

TABLE I.—Electrostatic properties of hollow bodies having the embodiment of a 0.33 liter short necked round bottle 16 cm. high and 6.5 cm. average bottom surface width.

| Ex. No. | Additions | Parts by weight [a] | Surface resistance in ohms | Fading away [1] of electric charge [b] | Ash test [b] [2] | Remarks |
|---|---|---|---|---|---|---|
| 9 | Thiodiethylene glycol-bis-β-aminocrotonate<br>Ca-Zn stearate<br>Butyl epoxy stearate<br>Cetyl alcohol | 2.0<br>0.2<br>0.8<br>1.0 | $5.10^{11}$ | ___do___ | ($\mp$) | Do. |
| 10 | Dioctyl-tin-bis-(thioglycol-acid-2-ethylhexyl ester)<br>Glycerine monostearate<br>Cetyl alcohol | 1.5<br>1.0<br>0.2 | $5.10^{11}$ | ___do___ | ($\mp$) | Do. |
| 11 | Dibutyl-tin-bis-(thioglycol-acid-2-ethylhexyl ester)<br>Cetyl alcohol<br>Glycerine monostearate [3] | 1.5<br>1.0<br>0.2 | $5.10^{11}$ | ___do___ | ($\mp$) | Do. |
| 12 | Dibutyl-tin-di-laurylmercaptide<br>Glycerine monostearate<br>Cetyl alcohol | 1.5<br>0.8<br>0.8 | $10^{10}$ | ___do___ | ($\mp$) | Do. |
| 13 | Dibutyl-tin-bis-(iso-octyl-thioglycolate) [5]<br>Glycerine monostearate [3]<br>Cetyl alcohol | 1.5<br>0.6<br>1.0 | $10^{10}$ | ___do___ | ($\pm$) | Do. |
| 14 | Dibuty-tin-bis-(thioglycol-acid-2-ethylhexyl ester)<br>Glycerine monostearate [3]<br>Cetyl alcohol | 1.5<br>0.5<br>1.0 | $3.10^{8}$ | Rapidly | + | Example according to the invention. |
| 15 | Dioctyl-tin-bis-(thioglycol-acid-2-ethylhexyl ester)<br>Glycerine monostearate [3]<br>Cetyl alcohol | 1.5<br>0.5<br>1.0 | $3.10^{8}$ | ___do___ | + | Do. |
| 16 | Thiodiethylene glycol-bis-β-amino crotonate<br>CaZn stearate<br>Butyl epoxy stearate<br>Glycerine monstearate [3]<br>Cetyl alcohol | 2.0<br>0.2<br>0.8<br>0.5<br>1.0 | $3.10^{8}$ | ___do___ | + | Do. |
| 17 | Dibutyl-tin-di-mercaptoethanol-lauric-acidester<br>Lauryl heptaethylene glycol<br>Oleic acid glycerine ester mixture [6] | 1.5<br>1.0<br>1.0 | $6.10^{8}$ | ___do___ | + | Do. |
| 18 | Dioctyl-tin-dimercaptoethanol-lauric-acid ester<br>Montanic-acid-myricyl ester<br>$C_{16}/C_{18}$ fatty alcohol mixture [4] | 1.5<br>0.7<br>1.2 | $5.10^{8}$ | ___do___ | + | Do. |
| 19 | Dibutyl-tin-bis-(thioglycolic-acid-2-ethylhexyl ester)<br>Montanic acid ester with 1-3-butanediol<br>$C^{16}/C^{18}$ fatty alcohol mixture [4] | 1.5<br>0.7<br>1.2 | $5.10^{8}$ | ___do___ | + | Do. |
| 20 | Dioctyl-tin-bis-(thioglycolic-acid-2-ethylhexyl ester)<br>Diethylene glycol monooleate<br>Lauryl heptaethylene glycol | 1.5<br>1.0<br>1.2 | $10^{9}$ | ___do___ | + | Do. |
| 21 | β-Aminocrotonic-acid-ethylhexyl ester/1-, 4-butylene glycol-bis-β-aminocrotonate mixture (1:1).<br>CaZn stearate<br>Butyl epoxy stearate<br>Heptaethylene glycol monolaurate<br>Myristyl alcohol | 2.0<br>0.2<br>0.8<br>0.6<br>1.2 | $3.10^{8}$ | ___do___ | + | Do. |
| 22 | Dibutyl-tin-bis-(thioglycol-acid-2-ethyl-hexylester)<br>Glycerine monocaprylate<br>Cetyl alcohol | 1.5<br>0.6<br>1.0 | $3.10^{8}$ | ___do___ | + | Do. |
| 23 | Dioctyl-tin-bis-(thioglycolic-acid-2-ethylhexyl-ester)<br>Glycerinemonolaurate<br>$C_{12}/C_{14}$ fatty alcohol mixture | 1.5<br>0.5<br>1.0 | $2.10^{8}$ | ___do___ | + | Do. |
| 24 | Thiodipropyleneglycol-bis-β-aminocrotonate<br>Ca-Zn-stearate<br>Butylepoxystearate<br>Glycerine monoarachinate<br>Myristyl tetrapropylene glycol | 2.0<br>0.2<br>0.8<br>0.6<br>1.3 | $10^{9}$ | ___do___ | + | Do. |
| 25 | Thiodibutyleneglycol-bis-β-aminocrotonate<br>Ca-Zn-stearate<br>Butylepoxystearate<br>Glycerine monobehenate<br>$C_{16}/C_{18}$ fatty alcohol mixture | 2.0<br>0.2<br>0.8<br>0.5<br>1.0 | $3.10^{8}$ | ___do___ | + | Do. |
| 26 | Thiodiethyleneglycol-bis-β-aminocrotonate<br>Diethyleneglycol-bis-β-amino-crotonate<br>Ca-Zn-stearate<br>Butylepoxystearate<br>Glycerinemonopelargonate<br>Myristic acid ester of cetyl alcohol<br>Octadecyl alcohol | 1.3<br>0.7<br>0.2<br>0.8<br>0.3<br>0.3<br>1.0 | $3.10^{8}$ | ___do___ | + | Do. |
| 27 | Thiodipropyleneglycol-bis-β-aminocrotonate<br>Dipropyleneglycol-bis-β-aminocrotonate<br>Ca-Zn-stearate<br>Butylepoxystearate<br>Glycerinemonopalmitate<br>Nonyldecaethyleneglycoldecylalcohol<br>Decylalcohol | 1.3<br>0.7<br>0.2<br>0.8<br>1.0<br>0.3<br>0.3 | $5.10^{8}$ | ___do___ | + | Do. |
| 28 | 1,4-Butyleneglycol-bis-β-aminocrotonate<br>Thiodiethyleneglycol-bis-β-aminocrotonate<br>Ca-Zn-stearate<br>Butylepoxystearate<br>Arachidic acid ester of hexaethylene glycol<br>1,3-Propanediol-monocaprylate<br>Cetylalcohol | 1.0<br>1.0<br>0.2<br>0.8<br>0.3<br>0.3<br>1.3 | $5.10^{8}$ | ___do___ | + | Do. |
| 29 | Dioctyl-tin-bis-(thioglycolic acid isooctylester)<br>Glycerinemonocaprinate<br>Stearylalcohol | 2.0<br>0.5<br>1.0 | $2.10^{8}$ | ___do___ | + | Do. |
| 30 | Dibutyl-bis-di-mercapto-ethanol lauric acid ester<br>Behenic acid ester of myricyl alcohol<br>1,3-Propanediol-monocaprylate<br>Cetylalcohol | 2.0<br>0.3<br>0.3<br>1.0 | | | | |
| 31 | Dioctyl-tin-bis-(thioglycolic-acid-2-ethylhexylester)<br>1-, 4-butylene glycol monopalmitate<br>Glycerine monostearate<br>Cetylalcohol | 2.0<br>0.3<br>0.6<br>0.6 | | | | |

[a] Based on 100 parts PVC having K value=58.
[b] At 50% R.H. and 23° C.

1. This means: slowly = half-life period greater than 30 minutes; rapidly = half-life period less than 30 minutes. Measurement is carried out after 24 hours storing of the samples at 23° C. and relative humidity of 50 percent while measuring the sample was in ca. 4 cm. distance from the measuring head of the field intensity meter according to Schwenkhagen (see M.

Buhler "Textilpraxis" 12/11 page 1147 (1957)).

2. This means: −=ashes are picked up at 50 percent relative humidity and 23° C. in a large volume; (∓) = the charge is lessened, and ash particles are still picked up; +=no ashes will be picked up under the stated conditions.

TABLE II.—THE INFLUENCE OF THE PROCESSING METHOD ON THE ELECTROSTATIC PROPERTIES OF THE PLASTICS PRODUCED IS SHOWN IN COMPARISON WITH INFLATABLE AND CALENDERED FILMS OF SIMILAR CONSISTENCY (60 μ)

| Ex. No. | Additions | Parts by weight [a] | Processed as— | Surface resistance in ohms [b] | Fading away of sound [1 b] | Ash test [2 b] | Remarks |
|---|---|---|---|---|---|---|---|
| 1 | Dioctyl-tin-bis-(thioglycolic acid-2-ethylhexyl ester) | 2.0 | Calendered films | >10^12 | Slowly | − | Comparative example. |
|  | Glycerine monostearate [3] | 2.0 |  |  |  |  |  |
|  | $C_{16}/C_{18}$ fatty alcohol mixture [4] | 0.5 |  |  |  |  |  |
| 2 | Dioctyl-tin-bis-(thioglycolic acid-2-ethylhexyl ester) | 2.0 | Inflated films | 5.10^8 | Rapidly | + | Example according to the invention. |
|  | Glycerine monostearate [3] | 2.0 |  |  |  |  |  |
|  | $C_{16}/C_{18}$ fatty alcohol mixture [4] | 0.5 |  |  |  |  |  |

[a] Based on 100 parts PVC having a K value of 60.
[b] At 23° C. and 50% R.H.

3. From γ-Chlorpropylene glycol and sodium stearate according to Guth, Example 44, 83; m.p. 73° C.

b 4. Mixture of approximately equal parts hexadecanol and octadecanol.

5. $(C_4H_9)-Sn-(OOC-CH_2-S-C_8H_{17})_2$.

6. Consisting of 69 percent monoglyceride, 18 percent diglyceride, 2 percent triglyceride, 11 percent glycerine.

In the examples 1 to 3 a lubricant composition was inserted as a processing prompter; this consisted of 0.4 parts by weight of stearic acid and 0.1 part by weight of cross-linked paraffin wax, m.p.: 83° C.

1. This means: slowly=half-life period greater than 30 seconds; rapidly = half-life period less than 30 seconds. Measurement is carried out after 24 hours storing of the samples at 23° C. and 50 percent relative humidity. While measuring the sample was in ca. 4 cm. distance from the measuring head of the field intensity meter according to Schwenkhagen (see M. Buhler "Textilpraxis" 12/11, page 1147 (1957)).

2. This means: − = ashes are picked up at 50 percent relative humidity and 23° C. in large volume: (∓) = the charge is lessened, and ash particles are still picked up; + = no ashes will be picked up under the stated conditions.

3. Produced from 65 chlorpropylene glycol and sodium stearate according to Guth, example 44, 83; m.p. 73° C.

4. Mixture of approximately equal parts hexadecanol plus octadecanol.

We claim:

1. Polyvinyl chloride compositions comprising:
    a. about 94 to 98.2 percent by weight polyvinyl chloride resin;
    b. about 1 to 3 percent by weight of a compound selected from the group consisting of $$\begin{array}{c} R \\ \diagdown \\ Sn \\ \diagup \\ R \end{array} \begin{array}{c} S-(CH_2)_n-COOR \\ \\ S-(CH_2)_n-COOR \end{array}$$

$$\begin{array}{c} R \\ \diagdown \\ Sn \\ \diagup \\ R \end{array} \begin{array}{c} S-(CH_2)_n-OCR \\ \parallel \\ O \\ S-(CH_2)_n-OCR \\ \parallel \\ O \end{array}$$

$$CH_3-C=CH-COOX,$$
$$\quad\quad |$$
$$\quad NH_2$$

$$CH_3-C=CH-COOR'-OOC-CH=C-CH_3,$$
$$\quad\quad | \quad\quad\quad\quad\quad\quad\quad\quad\quad\quad\quad |$$
$$\quad NH_2 \quad\quad\quad\quad\quad\quad\quad\quad\quad\quad NH_2$$

and mixtures thereof wherein R is an alkyl group having four to 12 carbon atoms, n is a whole number from 1 to 4, X is an alkyl or alkenyl group having eight to 20 carbon atoms and R' is an alkylene group with two to eight carbon atoms;

c. about 0.4 to 2.5 percent by weight of compounds selected from the group consisting of esters of a saturated fatty acid having seven to 30 carbon atoms esterified with a monovalent alcohol having eight to 31 carbon atoms, an unsaturated fatty acid having seven to 30 carbon atoms esterified with a monovalent alcohol having eight to 31 carbon atoms, partial esters of a saturated fatty acid having seven to 30 carbon atoms esterified with an alcohol selected from the group consisting of a polyvalent alcohol having two to four carbon atoms, a polyalkylene glycol having two to 10 ethylene oxide groups, a polyalkylene glycol having two to 10 propylene oxide groups and mixtures thereof and partial esters of an unsaturated fatty acid having seven to 30 carbon atoms esterified with an alcohol selected from the group consisting of a polyvalent alcohol having two to four carbon atoms, a polyalkylene glycol having two to 10 ethylene oxide groups, a polyalkylene glycol having two to 10 propylene oxide groups and mixtures thereof; and d. about 0.4 to 2.5 percent by weight of compounds selected from the group consisting of higher alcohols having nine to 28 carbon atoms, oxyalkylation products of higher alcohols having nine to 28 carbon atoms and one to 10 ethylene oxide groups, oxyalkylation products of higher alcohols having nine to 28 carbon atoms and one to 10 propylene oxide groups and mixtures thereof, wherein the combination of components b, c and d imparts antistatic properties to the compositions.

2. The compositions of claim 1, wherein component b is selected from the group consisting of dibutyl-tin-di-(mercapto-ethanol-capric acid ester), dihexyl-tin-bis-(thioglycol-acid-isooctyl ester), dioctyl-tin-bis-(thiopropionic-acid-2-ethylhexyl ester), dipentyl-tin-di-(mercapto-ethanolCAPRYLIC-acid ester), β-amino-crotonic acid hexadecyl ester, β-amino-crotonic acid hexadecenyl ester, β-amino-crotonic acid octadecyl ester, βamino-crotonic acid ethylhexyl ester, glycol-bis-amino-crotonate, thiodibutylene glycol-bis-β-amino-crotonate, thiodipropylene glycol-bis-β-amino-crotonate, diethylene glycol-bis-β-amino-crotonate, dipropylene glycol-bis-β-amino-crotonate, 1-,4-butylene glycol-bis-β-amino-crotonate and mixtures thereof.

3. The compositions of claim 1, wherein component c is selected from the group consisting of glycerine monocaprylate, glycerine monocaprinate, glycerine monopelargonate, glycerine monostearate, glycerine monolaurate, glycerine monoplamitate, glycerine monomyristinate, glycerine monooleate, glycerine monoarachinate, montanic acid myricyl ester, montanic acid ester with 1-, 3-butanediol, diethylene glycol monooleate, hepta ethylene glycol monolaurate and mixtures thereof.

4. The composition of claim 1, wherein componsnt d is selected from the group consisting of decyl alcohol, lauryl alcohol, cetyl alcohol, lauryl heptaethylene glycol, fatty alcohol mixture of alcohols having 16 to 18 carbon atoms, myristyl alcohol, octadecyl alcohol, ceryl alcohol, nonyl-decaethylene glycol, and mixtures thereof.

5. The compositions of claim 5, wherein R' includes a hetero atom selected from the group consisting of oxygen and sulfur.

6. THe compositions of claim 1, wherein X is an alkyl or alkenyl group having 16 to 18 carbon atoms.

7. The compositions of claim 1, wherein R' is an alkylene group with two to four carbon atoms.

8. The compositions of claim 1, wherein component c is about 0.6 to 1.5 percent by weight.

9. The compositions of claim 1, wherein component d is about 0.6 to 1.5 percent by weight.

* * * * *